UNITED STATES PATENT OFFICE.

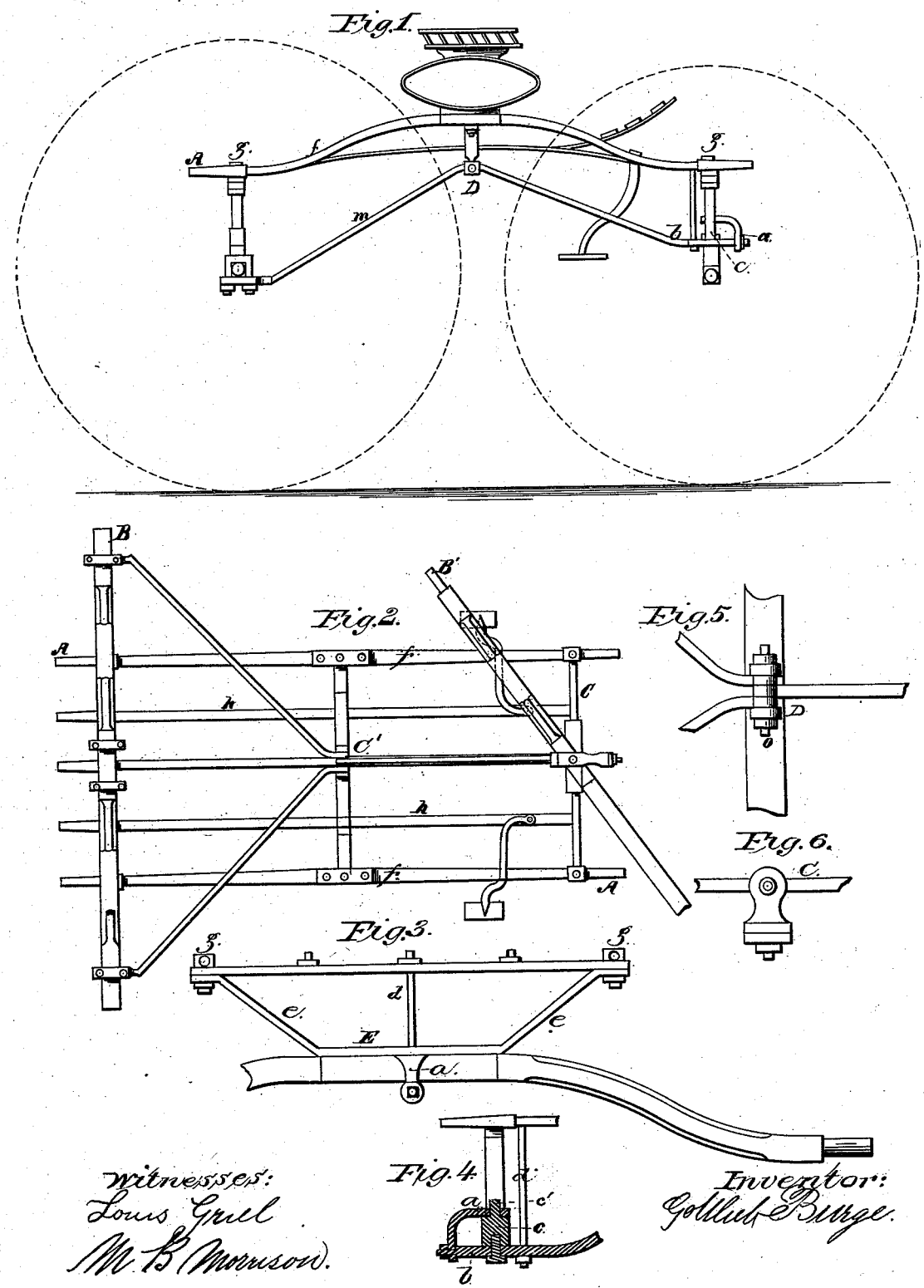

GOTTLIEB BURGE, OF KITTANNING, PENNSYLVANIA.

IMPROVEMENT IN RUNNING-GEARS.

Specification forming part of Letters Patent No. 168,136, dated September 28, 1875; application filed June 2, 1875.

*To all whom it may concern:*

Be it known that I, GOTTLIEB BURGE, of Kittanning, in the county of Armstrong and State of Pennsylvania, have invented certain new and useful Improvements in Buck-Wagons; and do hereby declare that the following is a full, clear, and exact description thereof, reference being had to the accompanying drawing and to the letters of reference marked thereon, forming a part of this specification.

My invention relates to that class of four-wheeled vehicles in which the forward and rear axles are connected in such a manner as to dispense with the ordinary head - block, king-bolt, and fifth-wheel; and it consists in the construction and arrangement of the various parts of a buck-wagon, as more fully hereinafter set forth.

Figure 1 represents a side view of wagon. Fig. 2 is a plan view of the under surface of body or bed frame. Fig. 3 is a front view of body. Fig. 4 is a sectional elevation of the forward coupling. Fig. 5 shows the manner in which the center connection of coupling-rod and back-stays is made, by means of a clevis and center-connection bolt, and Fig. 6 is a side view of the center connection.

A represents the bed-frame, composed of the metal side bars $f$, wooden slats $h$, and metal cross bars or bolsters C C', all securely fastened together by means of clips, bolts, or rivets $g$, in the usual manner. B B' are the axles supporting the plates forming part of slat or body raisers $e$ $e$. The axles are connected with each other by the coupling-rod $b$ and back-stays $m$, which unite at the center cross-bar C' to form the center coupling or main connection, being securely joined by means of a clevis, D, and its bolt $o$ attached to the under surface of the cross-bar. This clevis is riveted to the cross-bar and central slat, and has depending arms, through which the bolt $o$ passes, the ends of coupling-rod and stays being placed between the arms of clevis, and afterward held in position by means of the bolt referred to, thus forming a secure central coupling. The back-stays are connected with the rear axles by means of a clevis with clips or nuts, in the usual manner.

In Fig. 4 of the drawing is represented a section of the forward coupling $a$ $b$. The center or rest plate $c$ of the front axle is made with the turning-pin $c'$ solid upon it, to pass through a hole in the plate E above, the upper surface of the axle being the turn-plate. The plate E has its ends extended upward and outward at an appropriate angle to form the slat-raisers $e$ $e$, which act as braces to support the upper part of the wagon. Its front part has a projection, $a$, turned down at an angle below the axle, forming a bearing to receive the end of the coupling-rod $b$. On the under part of the coupling-rod, near the end, is a set-screw running through the coupling-rod and into the axle to keep them in proper position, and further security to the parts is afforded by a safe-bolt, $d$, placed at the rear of the axle and passing from the central slat to the coupling-rod, which bolt may be tightened when required by simply turning the nut at its lower end.

The central cross-bar C' is also made of metal with ends bent upward and outward for the purpose of giving support to the center of side bars at the point where the elliptic springs rest, and being firmly bolted to the slats $h$ combines them with each other and with the side bars, so as to provide a solid position for the center coupling, which is thus rendered perfectly safe and easy.

By dispensing with the ordinary head-block, fifth-wheel, and king-bolt, with their numerous clips, bolts, and nuts, likely to become loose and displaced, simplicity of construction is attained without impairing the strength of the vehicle or losing any of the advantages for which those parts were designed, and the body of the wagon being supported upon elliptic springs resting on the side bars an easy, agreeable motion is imparted to it.

I claim as my invention—

1. The plate E, provided with bearing $a$, in combination with the coupling-rod $b$ and rest-plate of axle $c$, having turning-pin $c'$ solid upon it, as and for the purpose specified.

2. The combination of the coupling-rod $b$, back-stays $m$, clevis D, and connecting-bolt $o$, with the center cross-bar C', slats $h$, and side bars $f$, all constructed substantially as shown and described.

GOTTLIEB BURGE. [L. S.]

Witnesses:
LOUIS GRIEB,
M. B. MORRISON.